(No Model.)
G. M. PRATT.
DUMPING CART.
No. 534,758. Patented Feb. 26, 1895.
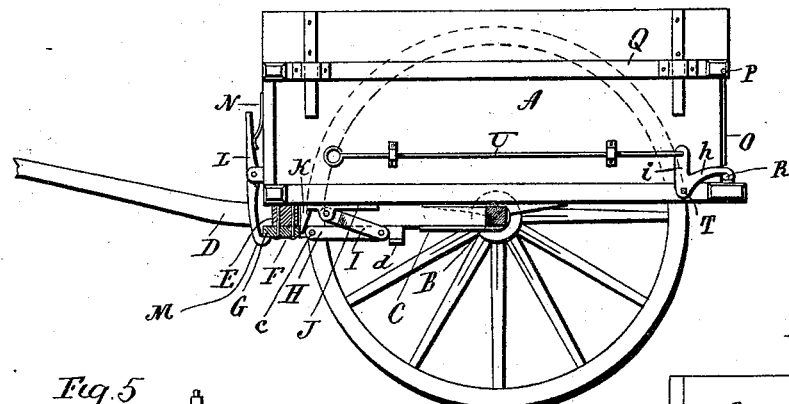
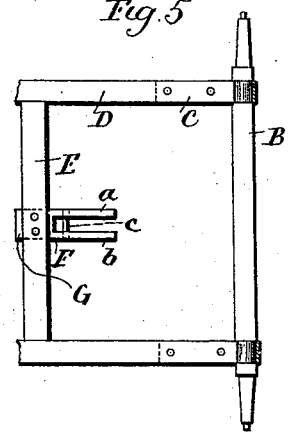
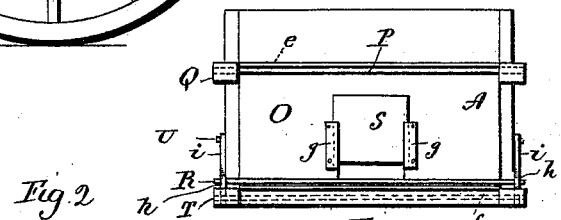
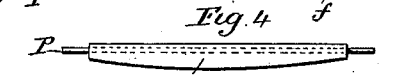
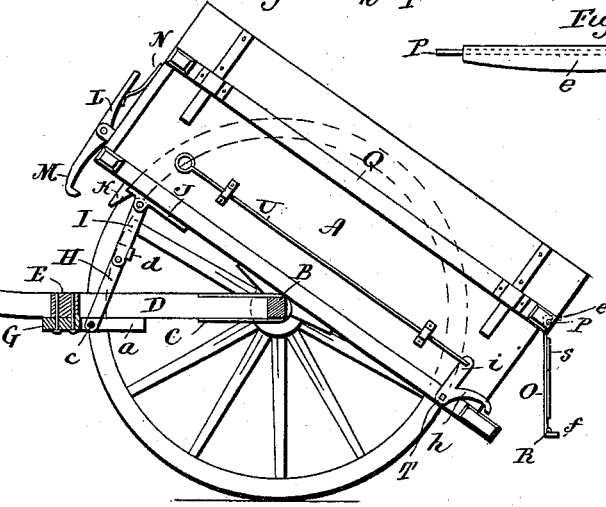
Witnesses,
George M. Pratt,
Inventor.
By Attys
Earle & Seymour
THE NORRIS PETERS CO., PHOTO-LITHO., WASHINGTON, D. C.

UNITED STATES PATENT OFFICE.

GEORGE M. PRATT, OF MIDDLETOWN, CONNECTICUT.

DUMPING-CART.

SPECIFICATION forming part of Letters Patent No. 534,758, dated February 26, 1895.

Application filed November 26, 1894. Serial No. 529,965. (No model.)

*To all whom it may concern:*

Be it known that I, GEORGE M. PRATT, of Middletown, in the county of Middlesex and State of Connecticut, have invented a new Improvement in Dumping-Carts; and I do hereby declare the following, when taken in connection with the accompanying drawings and the letters of reference marked thereon, to be a full, clear, and exact description of the same, and which said drawings constitute part of this specification, and represent, in—

Figure 1, a side view of the cart with one wheel and shaft removed showing the axle and cross-bar in section; Fig. 2, a similar view with the cart in a tilted or dumped position; Fig. 3, a rear view of the tailboard; Fig. 4, a top view of the same; Fig. 5, a top view of the axle and portion of the shafts with the body removed.

This invention relates to an improvement in two wheeled dump-carts, and particularly such as are adapted for the delivery of coal, the objects of the invention being to hang the cart directly upon the axle, provide means for holding the forward end of the cart in the down position and connect the forward end with the shafts, whereby the dumping movement is limited, and also to provide means extending to the forward end of the cart for releasing the lower end of the tail-board, and the invention consists in the construction as hereinafter described, and particularly recited in the claims.

A, is the body of the cart, which is rigidly secured to a square axle B, said axle being provided near each end with rounded portions to receive clips C, secured at the inner ends of the shafts D, said shafts extending from the axle nearly straight to a point beyond the end of the cart, and thence curved upward to the height required for properly balancing the cart. The connection of the shaft with the axle permits the axle and body to turn, without moving the shafts. Between the shafts forward of the axle, is a cross-bar E, to the under side of which is secured a plate F, the forward end G of which extends beyond the forward edge of the bar E, and the rear end of which is divided, forming arms *a b*, between which one end of a link H, is hung, upon a pivot *c*. The other end of the link H is connected to one end of a second link I, the opposite end of which is pivoted to a plate J, secured to the under side of the body, the forward end of said plate being constructed with a depending finger K, which will, when the body rests upon the shafts, extend between the arms *a b*, and forward of the pivot *c*, and whereby the lateral movement of the body is prevented. The end of the link H, extends beyond the connecting end of the link I, and is provided with a transverse arm *b*, which forms a rest for the link I, and prevents the possibility of the links passing beyond a straight line between the pivots at their opposite ends.

To the forward end of the cart a latch L, is secured, its nose M, depending below the cart, and so as to engage with the edge of the extension G, when the body of the cart rests upon the shafts, as shown in Fig. 1. Beneath the tail of the latch a spring N is arranged, the tendency of which is to throw the tail outward, and hence the nose inward, into engagement with the extension G, but yields to permit it to be detached therefrom. The tail-board O of the cart is preferably formed from a single piece of sheet-metal, the upper and lower edges of which are turned outward, forming flanges *e, f.* At the top, and in the angle formed between the body and the flange, a rod P is secured, the ends of which extend beyond the tail-board and through the top-rail Q of the body, and so that the said tail-board is pivotally connected therewith. In the angle formed between the body and the lower flange F, a second rod R, is secured, the ends of which extend beyond the tail-board. The said tail-board is also provided with an opening, closed by a slide S, which is also preferably formed from sheet-metal, and guided in ways *g, g*, which are strips of sheet-metal, secured to the face of the tail-board on each side of the opening. Beneath the bottom of the cart, and extending through the lower side braces thereof, is a rock-shaft T, to the outer ends of which are rigidly secured hooks *h*, adapted to engage the ends of the rods R. One of the hooks *h* is constructed with an arm *i* extending upward, and connected to an operating-rod U, which extends along one side of the body to a point convenient to be reached from the front end of the cart.

In case it is desired to discharge the load through a chute or into baskets, the slide S, in the tail-board, is raised, and the forward end of the body detached from the cross-bar of the shafts by releasing the catch L, from connection therewith, the said forward end of the cart raised to the limit of movement allowed by the links H I, in which position the load will readily be discharged through the opening in the tail-board. In case it is desired to empty the cart rapidly, as in dumping a load upon a walk, the forward end of the cart is raised, as above described, and at the same time the rod U is drawn forward, which operates the hooks, and releases them from engagement with the ends of the rods R at the bottom of the tail-board, and thus permits said tail-board to swing outward upon the pivots P, and as shown in Fig. 2, thus permitting the load to readily escape from the cart. By positively connecting the forward end of the cart to the shafts, the movement of the said body is controlled, and by forming the finger K on the plate J, which extends into engagement with the plate F, lateral play of the forward end of the body is positively prevented, and thus the strain on the connection between the body and the axle is prevented.

By arranging to operate the tail-board from the forward end of the cart at the same time the forward end is raised, the discharge of the contents is controlled to a greater extent than is possible when it is necessary to remove the tail-board before dumping the cart.

I am aware that sheet-metal tail-boards for carts have been employed, and also that tail-boards with discharge openings therein are old. I am also aware that such tail-boards have been pivoted at their upper ends and connected at their lower ends by latches which may be operated from the forward end of the cart; also that shafts have been connected to axles of carts by clips, and that the forward ends of carts have been connected to the running-gear by links to limit the upward movement of the forward end, and therefore do not wish to be understood as claiming broadly such as my invention.

I claim—

1. In a dumping cart, a tail-board formed from sheet-metal, with an outwardly extending flange at the top and bottom formed integral therewith, rods secured to said tail-board in the angles formed between the body and said flanges, the upper rod forming pivots by which said tail-board is secured to the top of the body, and means for securing the ends of said lower rod, substantially as described.

2. In a dumping cart, a tail-board formed from sheet-metal, with an outwardly extending flange at the top and bottom formed integral therewith rods secured to the top and bottom thereof, and projecting beyond the sides of the same, said top rod forming the pivot by which said tail-board is secured to the top of the body, latches secured on each side of the body, and adapted to engage the ends of the lower rod on the tail-board, said latches connected by a rock-shaft, and a rod extending from one of said latches to the forward end of the cart, substantially as described.

3. In a dumping cart the shafts of which are provided with a cross-bar near the forward end of said cart, a plate secured to said cross-bar, a plate secured to the under side of the body, links connecting said plate, and whereby the tilting movement of said cart is controlled, and a projection from the plate on the body, adapted to extend into engagement with the plate on the cross-bar, and whereby lateral play of the cart is avoided, substantially as described.

4. In a dumping-cart, the shafts of which are provided with a cross-bar near the forward end of said cart, a plate secured to said cross-bar, and extending forward beyond the same, and links between the bottom of said body and said plate, whereby the tilting movement of the cart is controlled, and a latch secured to the forward end of the cart, and adapted to engage the projecting forward end of the plate on the cross-bar, substantially as described.

In testimony whereof I have signed this specification in the presence of two subscribing witnesses.

GEORGE M. PRATT.

Witnesses:
CLIFFORD C. GILBERT,
FRANK D. HAINES.